Figures 4, 6:
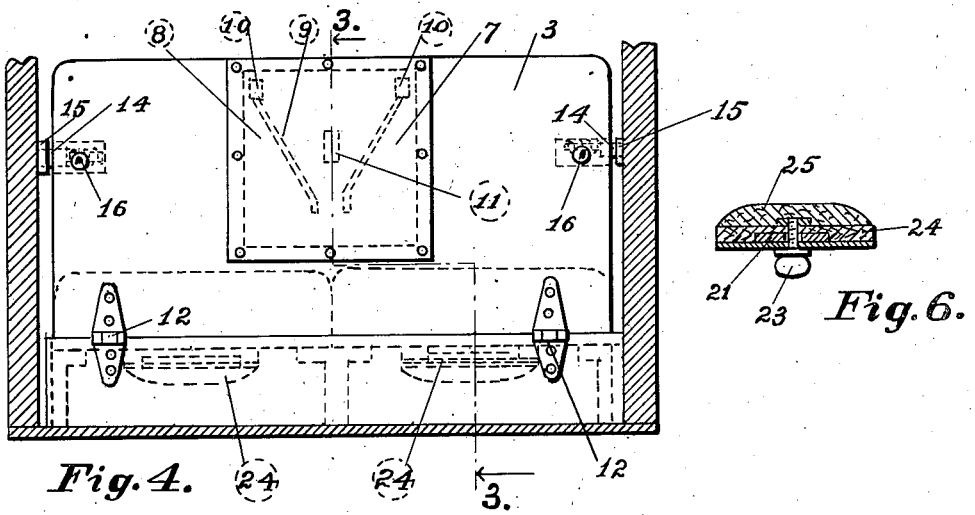

Sept. 21, 1937.  F. BUNEVAC  2,093,861
CONVERTIBLE AUTO INTERIOR
Filed Jan. 11, 1937   2 Sheets-Sheet 1
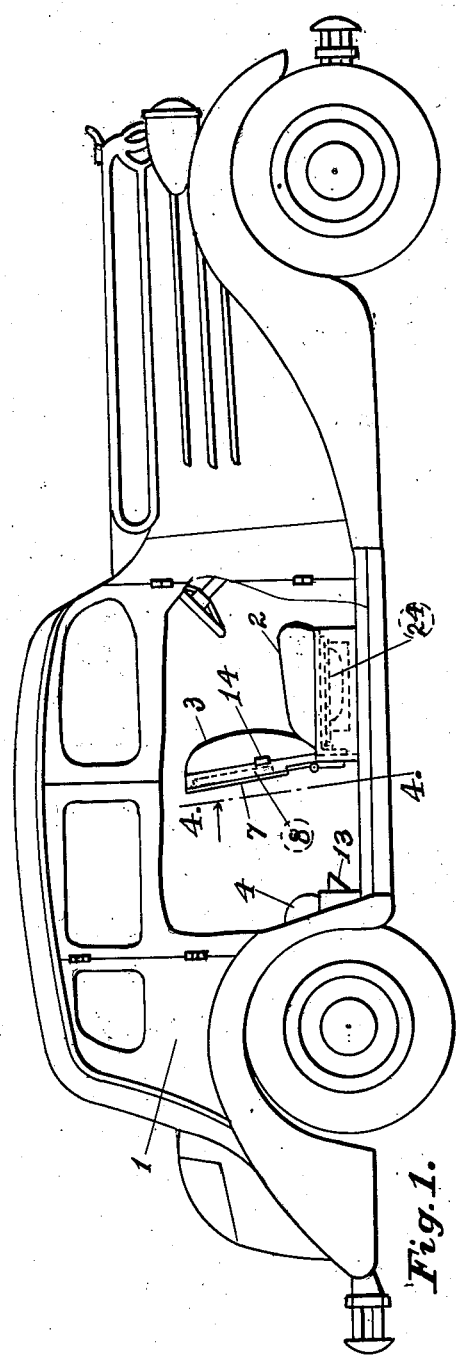
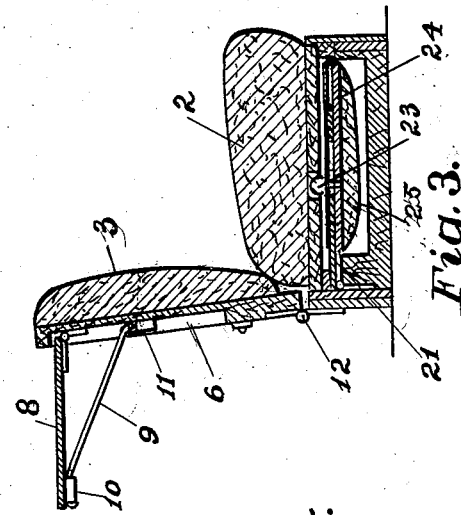
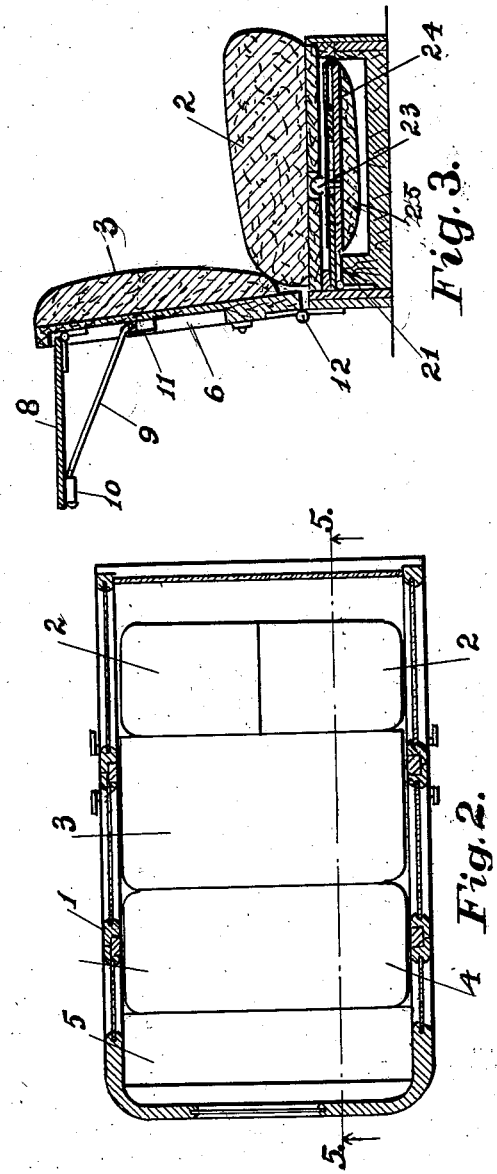
Inventor
Frank Bunevac
By H. M. Plaisted,
Attorney Sept. 21, 1937.   F. BUNEVAC   2,093,861
CONVERTIBLE AUTO INTERIOR
Filed Jan. 11, 1937   2 Sheets-Sheet 2

Inventor
Frank Bunevac
By H. M. Plaisted,
Attorney

Patented Sept. 21, 1937

2,093,861

UNITED STATES PATENT OFFICE 2,093,861

CONVERTIBLE AUTO INTERIOR

Frank Bunevac, St. Louis, Mo., assignor of one-half to Paul Bunevatz, St. Louis, Mo.

Application January 11, 1937, Serial No. 119,917

3 Claims. (Cl. 155—7)

This invention relates to certain new and useful improvements in convertible auto interiors, the peculiarities of which will be hereinafter fully described and claimed.

My improvements relate to that class of inventions in which an automobile or similar vehicle, has its interior temporarily transformed or changed from its normal condition and arrangement to adapt it to special uses or requirements other than its normal use.

My improvements have reference to providing means, first, for rearranging the cushioned seats and their backs in an auto, to form a bed the full width of the interior and its length from the back of the rear seat to the front edge of the driver's seat; second, for providing the driver's seat with an alternate back support, normally disposed out of sight, but available while maintaining the bed arrangements; third, for similarly providing a back support for the seat adjacent that of the driver, while allowing the balance of the bed to be used, as for children; and fourth, for providing a shelf, normally concealed in its folded position, but available for use when the normal condition of the interior is restored; and fifth for various details of construction and operation herein described and claimed.

Figure 5:
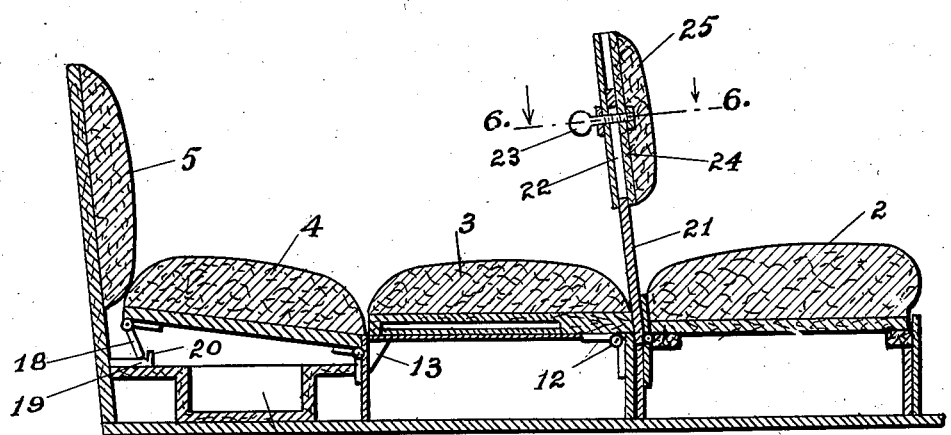

In the accompanying drawings in which like reference numerals indicate corresponding parts, Fig. 1 represents a side elevation of an auto, partly broken away to show the interior, and my improvements applied thereto;

Fig. 2, a sectional plan view showing my arrangement for a bed practically the full length and width of the interior;

Fig. 3, a vertical section of the front seat and its back in normal position, and my improved shelf as raised from a recess in said back and supported in position for use;

Fig. 4, a rear view of the front seat back showing its hinged connections at its lower edge, its locked connections to the sides of the car, and the said shelf and alternate backs indicated in their concealed positions;

Fig. 5, a vertical section on the line 5—5 of Fig. 2, showing an alternate back in position for use, the bed arrangement as in Fig. 2, the rear seat partly raised from its horizontal position, and the adjustable shelf hidden in the recess in the back of the front seat; and Fig. 6, a horizontal section of the alternate back on the line 6—6, Fig. 5, showing side portions and the slot in the lower section of the alternate back.

Referring to the drawings, the numeral 1 designates the enclosing sides of an auto vehicle of any suitable style, having divided front seats 2 and a back 3 of my construction, and my hinged rear seat 4 and its back 5.

At the rear face of the back 3 is formed a recess 6 (Fig. 3) normally closed by a curtain 7 that is detachably fastened by buttons or otherwise so as to be practically flush with the rear surface of said back 3. In said recess is normally concealed a shelf 8, hinged at its forward edge near the top of said recess, and supported in horizontal position by braces 9 which are rotatably mounted at their outer ends in cylindrical boxes 10 secured to said shelf.

The inner lower ends of said braces are set in sockets 11 fastened in said recess, to support the shelf horizontally as shown in Fig. 3. This shelf can thus be used for supporting a lunch when the auto is used as a lunchroom. The said shelf may be used for other purposes, such as playing bridge, or games thereon as desired.

When the shelf is to be hidden in the recess, the braces are raised from the sockets 11, rotated in said bearings 10 so as to lie flat against the inner face of the shelf and allow the shelf with its braces to be set back in the recess and hidden by the curtain as indicated in Fig. 4.

When the interior of the auto is to be used for sleeping, the back 3 is turned on the hinges 12 mounted at its lower edge, to a horizontal position where it is supported by a projection 13 as indicated in Fig. 1. Said back is maintained in its normal position by a fastening securing it detachably to the sides of the car. Such fastenings preferably consist of spring bolts 14 mounted on the sides of said back and engaging sockets or recesses 15 secured to the sides of the car. A tumbler 16 operated by a key, releases each of these locking devices to allow swinging down the said back 3 to its horizontal position shown in full lines in Fig. 5.

The rear seat 4 is preferably hinged at its forward edge to the seat frame, as shown in Fig. 5, so as to swing upward when it is desired to have access to a tool box 17. The rear edge of said seat 4 is provided with a pivoted wing prop such as a double-winged hinge secured by one wing to the bottom of said seat. The pendent wing engages a retaining block 19 (Fig. 5). This block has a lip 20 which serves as a stop for the wing 18 to avoid slipping when more or less inclined and holds the seat 4 more or less raised as in Fig. 5 when desired.

When the wing is moved to a horizontal position, the seat 4 will be disposed horizontally and the lip 20 will be engaged by the wing 18. The seat 4 may thus be slightly raised, to support the head of the person resting on the bed, or it may be horizontal and level with the other of said cushions to form a level bed.

A bed is formed that is practically the size of a double bed in width and length. When it is desired to drive the car while it is still converted for sleeping or resting upon the bed, such as in cases of an accident and the injured person is to be transported to a hospital, the portion of the driver's seat opposite the steering wheel is provided with an adjustable back as an alternate back rest to take the place of the back 3 which remains in its horizontal position. I therefore provide such an alternate back support, preferably consisting of a lower section 21 hinged at its bottom edge to or otherwise mounted on the frame below the front seat, and having a slot 22 in its upper portion, through which passes a thumb screw 23 mounted in the upper section 24. This section 24 preferably is upholstered in the front to form a cushioned back rest 25 and is formed in two parts to provide the recess for the slotted lower section. Normally this alternate back is shortened by sliding the upper section on the lower section so as to fit in the seat frame and be hidden under the front seat as shown in Fig. 3. When required for use the front seat 2 is raised temporarily to allow the said section 21 and its cushioned upper section to be vertically disposed between the front seat and its lowered back. The thumb screw being loosened, the upper cushioned section can be raised the length of the slot till the thumb screw engages the upper end of it. When tightened, the back is held in extended position. This back can be adjusted to the desired height by loosening the thumbscrew, moving the back up or down and then tightening the screw again. The supporting cushion 25 can thus be fitted to the use of any one occupying the driver's seat.

Therefore the auto may be driven while the half of the bed opposite the driver's seat is used by occupant.

Each of the front seats 2 is preferably provided with a similar alternate back, as indicated by dotted lines in Fig. 4. Then, if desired, both alternate back supports may be used, in each case the full length of bed as reduced somewhat, but may still be used for children or for persons of similar stature.

My converted interior when changed for providing a bed, may thus be a full length double width bed, or a full length on one side and substantially three-fourths length on the other side of the bed behind the driver's seat when the alternate back has been raised for his convenience. Furthermore when two persons are using the front seat, the reduced length of bed caused by both of the alternate backs being raised to the position in Fig. 5, allows the bed still to be used while the machine is being driven as above described.

I do not confine myself to the exact construction herein shown except by the appended claims.

The present application is an improvement over my Patent No. 1,619,918, dated March 8, 1927 for Automobile body.

I claim:

1. A convertible auto interior comprising a divided front seat, and a seat back therefor the width of the auto hinged at its lower edge and swung downward to the rear from its normal vertical position, means to hold it detachably in vertical position, and a back rest for one division of the front seat characterized by being in two sections, one section being hinged at its bottom end to the seat frame below the seat and slidably connected to the other section for relative adjustment to different heights above the front seat, and means to fix one section relative to the other in said adjustment.

2. A convertible auto interior having in combination, a removable front seat and its back horizontally disposed for a bed, and a back rest opposite the steering wheel for use of the driver while the front seat back is horizontally disposed, characterized by a section hinged by its bottom end to the seat frame below the front seat and thus adapted to be disposed horizontally below the front seat and normally hidden thereunder and be accessible when the seat is temporarily removed and said section is vertically disposed by being manually swung up for use as a back rest, substantially as described.

3. A convertible auto interior having in combination, a front seat and its back horizontally disposed for a bed and an adjustable back rest characterized by upper and lower sections slidingly connected, the lower section being hinged at its bottom end to the seat frame to allow swinging it by hand to either horizontal or vertical position, and the upper section slidably mounted on the lower section to shorten or extend it, and means adjustably fixing the sliding movement of the upper of said sections when extending it to fit the back of the driver or shortening it for disposing it under the front seat, substantially as described.

FRANK BUNEVAC.